United States Patent
Qin et al.

(12)
(10) Patent No.: US 6,692,160 B2
(45) Date of Patent: Feb. 17, 2004

(54) RE-ALIGNABLE PACKAGING FOR MULTI-PORT FIBER OPTICAL DEVICES

(75) Inventors: Yi Qin, Pleasanton, CA (US); Charles X.W. Qian, Cupertino, CA (US)

(73) Assignee: Nexfon Corporation, Fremont, CA (US)

(*) Notice: Subject to any disclaimer, the term of this patent is extended or adjusted under 35 U.S.C. 154(b) by 188 days.

(21) Appl. No.: 09/964,594

(22) Filed: Sep. 28, 2001

(65) Prior Publication Data

US 2003/0063864 A1 Apr. 3, 2003

(51) Int. Cl.⁷ ................................................ G02B 6/38
(52) U.S. Cl. ................................................... 385/74
(58) Field of Search .......................... 385/74, 73, 66, 385/55, 53, 34, 33, 52, 51, 61, 93

(56) References Cited

U.S. PATENT DOCUMENTS 6,019,522 A   2/2000   Kim

*Primary Examiner*—Javaid H. Nasri
(74) *Attorney, Agent, or Firm*—Leonard Tachner

(57) ABSTRACT

A packaging method and apparatus that improve the yield and reliability of multi-port fiber optical devices are disclosed. The method utilizes a flexible metallic connection between a solid frame holding input and output optics (including fibers, collimators) and the main body of an optical device. Optical alignment and realignment are accomplished following the soldering and/or hermetically sealing of the entire package. A flexible connection is made with permeable material that has minimum stress memory associated with realignments and can tolerate repeated adjustment or realignment without becoming structurally unsound.

8 Claims, 3 Drawing Sheets

RE-ALIGNABLE PACKAGING FOR MULTI-PORT FIBER OPTICAL DEVICES

BACKGROUND OF THE INVENTION

1. Field of the Invention

The present invention relates generally to optical components and their use in optical communications and more particularly to a method and apparatus for achieving optical packages that can be realigned following hermetical sealing.

2. Background Art

Optical fiber and related devices provide new avenues to transmit light and hence are becoming important in areas of optical communication, remote optical measurement and sensing. In many demanding applications, long operating lifetimes up to 25 years and low device failure rates are desired.

Many of the prior art telecom components are packaged utilizing soldering processes as described, for example, in U.S. Pat. No. 6,019,522 and other similar patents. Following the soldering process, however, many devices suffer degradation of the original optical alignment. Frequently, devices are reworked to recover some of the insertion losses. Due to the properties of the prior art packaging materials used, however, individual devices can only be reworked for a few times.

There are several disadvantages associated with these prior packaging methods. For instance, the number of times a device can be reworked is limited and due to the properties of the materials used, it is often difficult to avoid under or over adjustments. There is therefore a need for an improved packaging method and design such that the limitation on realignments can be substantially reduced.

SUMMARY OF THE INVENTION

In accordance with the present invention, a method and configuration of fiber optic device packaging with realignment capability is disclosed. In this new design, a flexible interconnection between the solid frame holding the optics and the remaining part is provided. These interconnections are made with a highly permeable alloy such that realignment can be performed repeatedly without risking device integrity. In addition, the new design allows tight fitting of optics and its holding frame, making it possible to use epoxy to secure the interfacing seal instead of solder. This may substantially increase the product yield as many reliability and stability related problems are removed. Several embodiments that incorporate this interconnection are revealed. The invention can be used to enhance manufacturing yields of optical communication devices containing single-, dual- and multi-fiber collimators, mirrors and other optical elements.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DESCRIPTION OF THE PREFERRED EMBODIMENTS

Figure 1A:
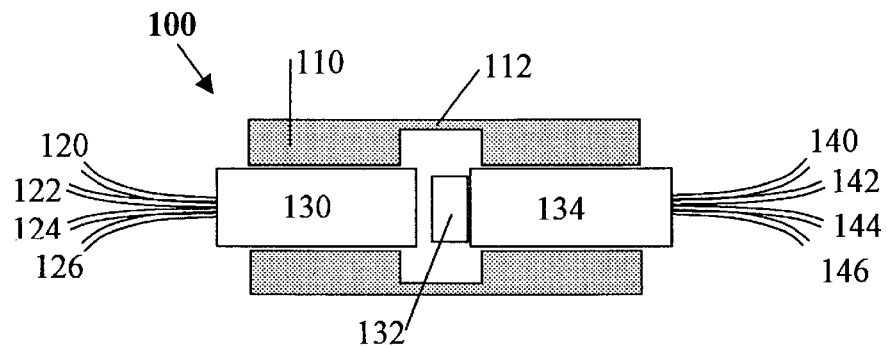
FIG. 1A is a simplified diagram illustrating an embodiment of the present invention where an optical device consists of two fiber collimators and a filtering element.

In the following the details of various preferred embodiments of the present invention are disclosed. The preferred embodiments are described with the aid of the accompanying drawings, wherein like reference numerals refer to like elements throughout.

Figure 1B:
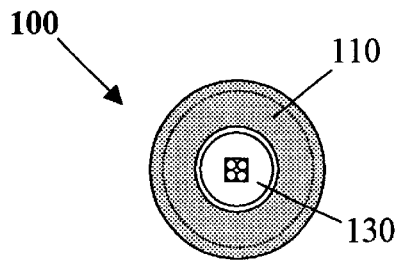
FIG. 1B is a simplified diagram illustrating the side view of FIG. 1A.

FIGS. 1A and 1B are diagrams illustrating an optical assembly 100 in accordance with the present invention. The optical device consists of two multi fiber collimators 130, 134, a wavelength-filtering device 132 and a package 110 with a flexible interconnect 112. The collimators 130, 134 and the outer package 110 are soldered/brazed together such that hermetical seals are formed. Input and output optical fibers 120 through 126, 140 through 146 are used to couple light into and out of the device. The collimators ensure the proper interface with the filtering device such that a small range of angles are involved. The flexible interconnect 112 is made with highly permeable alloy such as Carpenter 49® alloy. Carpenter 49® alloy is a non-oriented 48% nickel/iron alloy processed for high permeability that is available from Carpenter Technology Corporation of Wyomissing, Pa. Other comparable materials may be substituted for this alloy. Realignment of the device can be performed repeatedly by changing the relative orientation of the two collimators without risking device integrity.

Figure 2A:
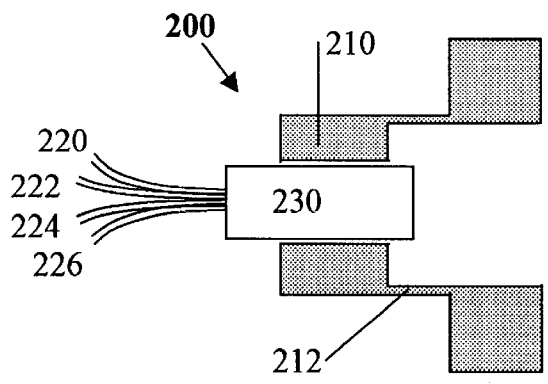
FIG. 2A is a simplified diagram illustrating a multi fiber collimator inserted into a flange, with a flexible interconnect.
Figure 2B:
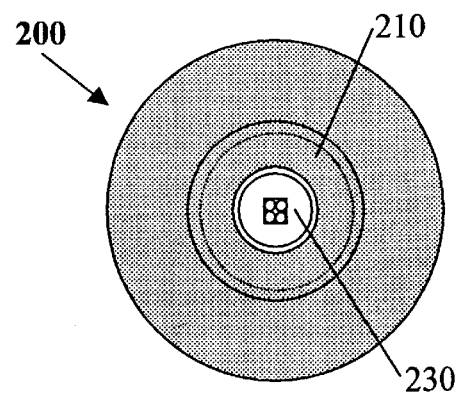
FIG. 2B is a diagram illustrating the side view of FIG. 2A.

Referring now to FIGS. 2A and 2B, an interface section 200 of an optical assembly is disclosed. This interface section consists of a multi fiber collimator 230 with the accompanying input/output flange 210 where a flexible interconnect 212 forms part of the flange. The collimator 230 and the flange 210 are soldered/brazed together such that a hermetical seal is formed. Input and output optical fibers 220 through 226 are used to couple light into and out of the device. The collimator ensures the proper interface with the optical device such that a small range of angles are involved. The flexible interconnect 212 is made with highly permeable alloy such as Carpenter 49® alloy. Realignment of the device can be performed repeatedly by changing the relative orientation of the collimator and the remaining part of the assembly without risking device integrity.

Figure 3A:
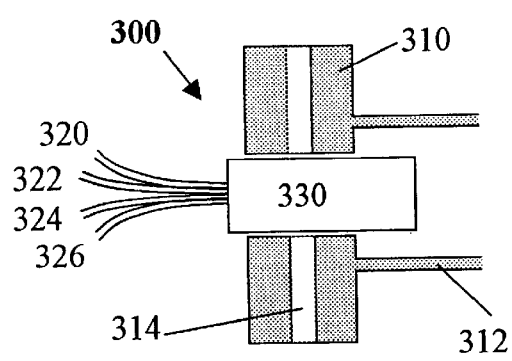
FIG. 3A is a diagram illustrating an embodiment of the present invention where a multi fiber collimator can be soldered to an input/output flange.
Figure 3B:
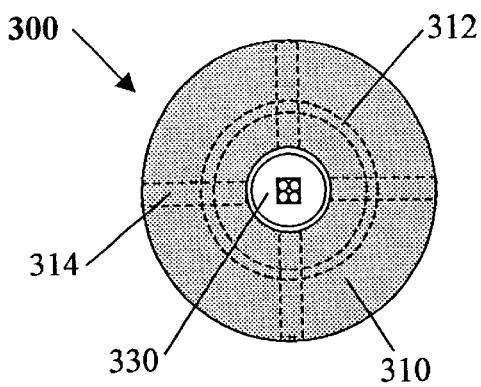
FIG. 3B is the side view of the embodiment presented in FIG. 3A.

Referring now to FIGS. 3A and 3B, an interface section 300 of an optical assembly is disclosed. This interface section consists of a multi fiber collimator 330 with the accompanying input/output flange 310 where a flexible interconnect 312 forms part of the flange. The collimator 330 and the flange 310 are soldered/brazed together such that a hermetical seal is formed. Input and output optical fibers 320 through 326 are used to couple light into and out of the device. The collimator ensures the proper interface with the optical device such that a small range of angles are involved. The flexible interconnect 312 is made with highly permeable alloy such as Carpenter 49® alloy. Realignment of the device can be performed repeatedly by changing the relative orientation of the collimator and the remaining part of the assembly attached to the other end of 312 without risking device integrity. Several air channels 314 are provided which are used for introducing soldering material in the soldering and brazing process.

Figure 4:
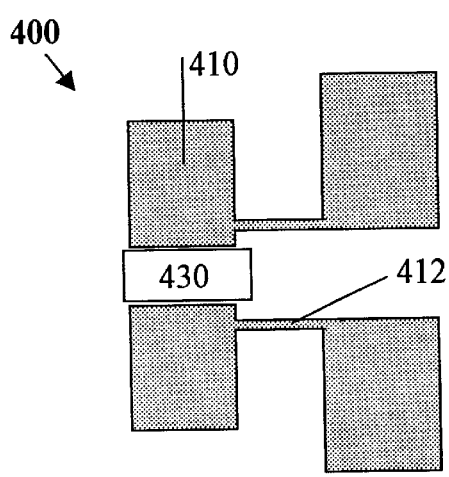
FIG. 4 is a schematic diagram illustrating an optical device and an associated flange with a flexible interconnect.

Referring now to FIG. 4, an interface section 400 of an optical assembly is disclosed. This interface section consists of an optical device 430 with the accompanying input/output flange 410 where a flexible interconnect 412 forms part of the flange. The outer packaging material of the optics 430 and the flange 410 are soldered/brazed together such that a hermetical seal is formed. The optics can be a mirror, a lens, a filter, a properly terminated optical fiber, an optical window or a nonlinear crystal. Further, the optics may be formed by multiple optical elements combined as a sub assembly. The surfaces of the optics may be coated for antireflection and or other desired filtering functions such as band pass or edge filtering. The flexible interconnect 412 is made with highly permeable alloy such as Carpenter 49® alloy. Realignment of the device can be performed repeatedly by changing the relative orientation of the optics and the remaining part of the assembly attached to the other end of 410 without risking device integrity.

Figure 5:
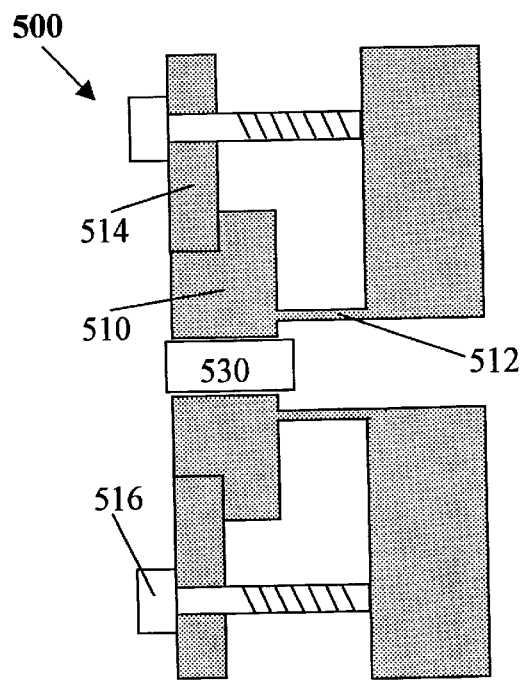
FIG. 5 is a schematic diagram illustrating an optical device and associated flange with a flexible interconnect where alignment screws are incorporated.

Referring now to FIG. 5, an interface section 500 of an optical assembly is disclosed. This interface section consists of an optical device 530 with the accompanying input/output flange 510 where a flexible interconnect 512 forms part of the flange. The section further consists of alignment arms 514 attached to the flange where alignment screws 516 are used to adjust and maintain optical alignment. The outer packaging material of the optics 530 and the flange 510 are soldered/brazed together such that a hermetical seal is formed. The optics can be a mirror, a lens, a filter, a properly terminated optical fiber, an optical window or a nonlinear crystal. Further, the optics may be formed by multiple optical elements combined as a sub assembly. The surfaces of the optics may be coated for antireflection and or other desired filtering functions such as band pass or edge filtering. The flexible interconnect 512 is made with highly permeable alloy such as Carpenter 49® alloy. Realignment of the device can be performed repeatedly by changing the relative orientation of the optics (through aligning screws 516) and the remaining part of the assembly attached to the other end of 510 without risking device integrity.

Figure 6:
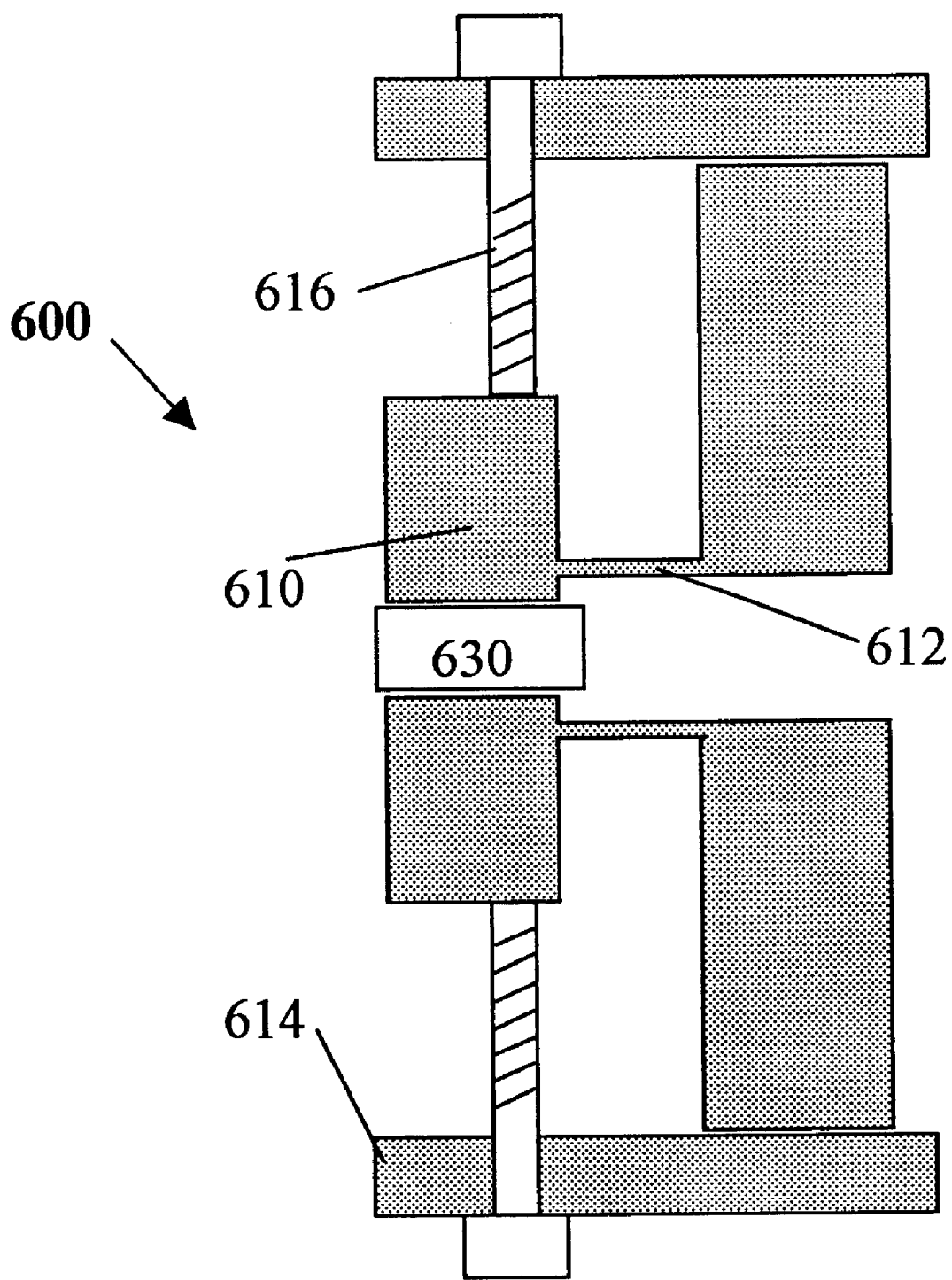
FIG. 6 depicts an optical device and associated flange with another form of flexible interconnect where alignment screws are incorporated.

Referring now to FIG. 6, an interface section 600 of an optical assembly is disclosed. This interface section consists of an optical device 630 with the accompanying input/output flange 610 where a flexible interconnect 612 forms part of the flange. The section further consists of alignment arms 614 attached to the flange where alignment screws 616 are used to adjust and maintain optical alignment. The outer packaging material of the optics 630 and the flange 610 are soldered/brazed together such that a hermetical seal is formed. The optics 630 can be a mirror, a lens, a filter, a properly terminated optical fiber, an optical window or a nonlinear crystal. Further, the optics may be formed by multiple optical elements combined as a sub assembly. The surfaces of the optics may be coated for antireflection and or other desired filtering functions such as band pass or edge filtering. The flexible interconnect 612 is made with highly permeable alloy such as Carpenter 49® alloy. Realignment of the device can be performed repeatedly by changing the relative orientation of the optics (through aligning screws 616) and the remaining part of the assembly attached to the other end of 610 without risking device integrity.

Having thus disclosed various embodiments of the present invention, it will be understood that numerous alternative embodiments are contemplated. By way of example, the interconnect between respective flanges may be made of many other highly permeable materials and may be formed of a material which is different from the material of which the flanges are made. Moreover, while the interconnect is disclosed as having a constraint reduced thickness, the invention also contemplates having an interconnect having a gradually reduced thickness such as one that is tapered or arched. The intent is to facilitate repeated bending with a material that will retain each new bend and remain structurally sound despite many such adjustments. Therefore the scope of the invention is limited only by the appended claims and their equivalents.

What is claimed is:

1. An optical device comprising:
   at least one input optical fiber and at least one output optical fiber;
   a collimator configured for receiving said input and output optical fibers for collimating light therein;
   an outer peripheral package radially enclosing at least a portion of said collimators and forming a flange for receiving an optical component to be aligned with said collimator, said package having a portion of reduced thickness forming a flexible interconnect to said flange, said flexible interconnect being made of a permeable material to permit repeated adjustment of said collimator relative to said flange.

2. The optical device recited in claim 1 wherein said collimators is hermetically sealed to said package.

3. The optical device recited in claim 2 wherein said collimator remains hermetically sealed to said package despite said repeated adjustment of the axial orientation of said collimator.

4. An optical device comprising:
   at least one input optical fiber and at least one output optical fiber;
   a first optical component configured for receiving said input and output optical fibers for collimating light therein;
   an outer peripheral package radially enclosing at least a portion of said first optical component and forming a flange for receiving a second optical component to be aligned with said first optical component, said package having a portion of reduced thickness forming a flexible interconnect to said flange, said flexible interconnect being made of a permeable material to permit repeated adjustment of said first optical component relative to said flange.

5. The optical device recited in claim 4 wherein said optical components are hermetically sealed to said package.

6. The optical device recited in claim 4 wherein said optical components remain hermetically sealed to said package despite said repeated adjustment of the axial orientation of said optical components.

7. A method for providing a realignment capability in an optical device wherein repeated realignment is tolerated substantially without diminishing the structural integrity of the device; the method comprising the following steps:
   a) providing at least two optical components having a selected relative orientation;
   b) securing said components into respective flanges interconnected by an intermediate portion of reduced thickness and made of a permeable material; and c) sealing at least one of said components to its respective flange to provide a hermetical seal therebetween.

8. The method recited in claim 7 wherein step a) comprises the step of selecting said optical components from a group consisting of optical fiber, lenses, windows, nonlinear crystals, mirrors, filters, collimators and combinations thereof.

* * * * *